United States Patent

[11] 3,551,606

[72] Inventor Stephen H. Chapman
RR 3, Milan, Tenn. 38358

[21] Appl. No. 707,214
[22] Filed Feb. 21, 1968
[45] Patented Dec. 29, 1970

[54] ELECTRONIC KEY TELEPHONE
8 Claims, 1 Drawing Fig.

[52] U.S. Cl. .......... 179/99
[51] Int. Cl. .......... H04m 1/00
[50] Field of Search .......... 179/99

[56] References Cited

UNITED STATES PATENTS 3,114,801 12/1963 Kirkham .......... 179/99
3,283,083 11/1966 MacLeod .......... 179/99
3,420,963 1/1969 Abbot et al. .......... 179/99

*Primary Examiner*—Kathleen H. Claffy
*Assistant Examiner*—William A. Helvestine
*Attorneys*—C. Cornell Remsen, Jr., Rayson P. Morris, Percy P. Lantzy, J. Warren Whitesel and Delbert P. Warner

ABSTRACT: A Silicon Controlled Switch (SCS) is connected across each line of a keyset telephone. The switch is turned on to place a hold on a line during transfer condition. The SCS hold bridge is controlled by the sequence in which line key contacts open and close and by current divisions when a plurality of telephone sets are connected to the same line.

PATENTED DEC 29 1970 3,551,606
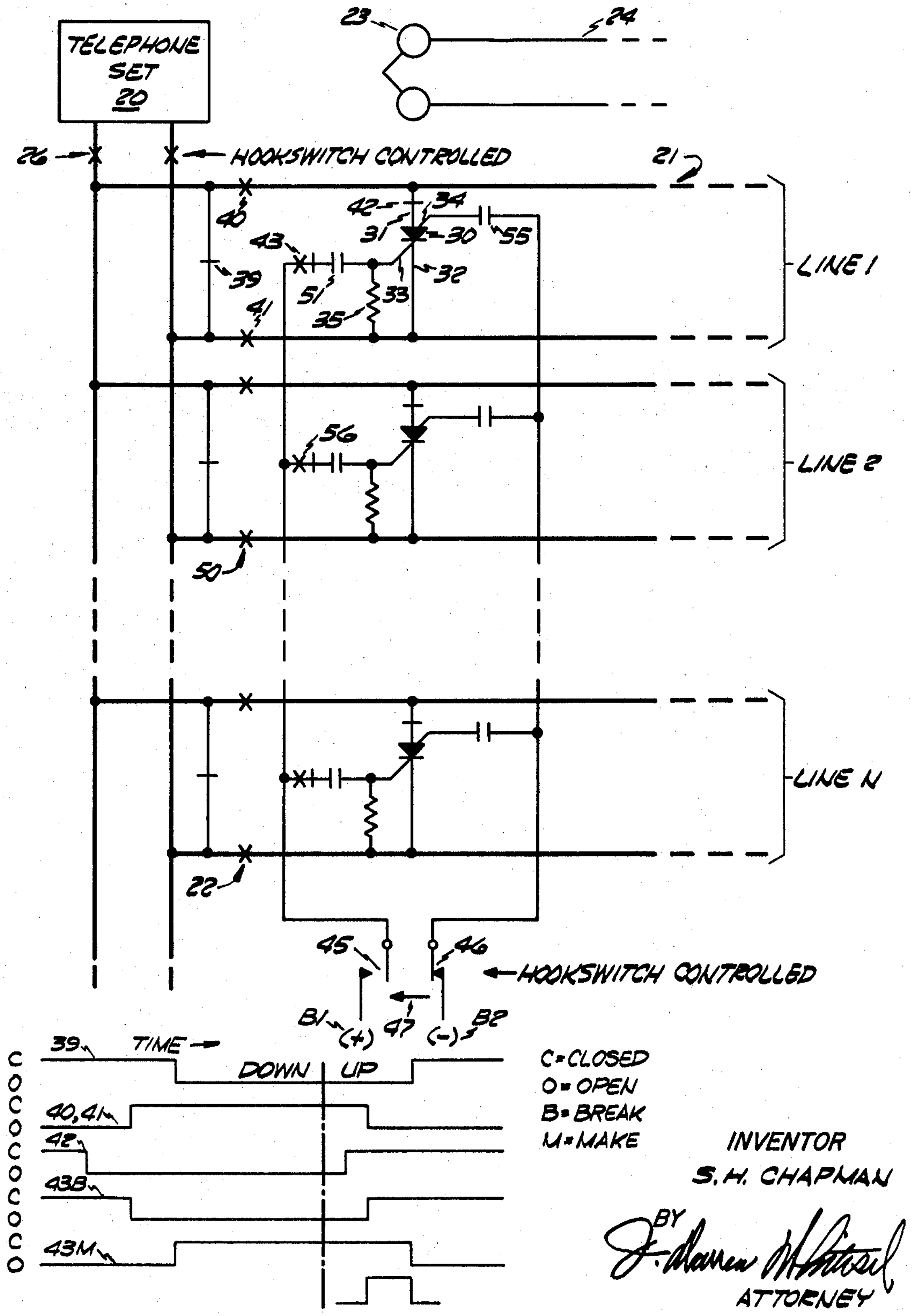
INVENTOR
S. H. CHAPMAN
BY
ATTORNEY

ELECTRONIC KEY TELEPHONE

This invention relates to key telephone systems and more particularly to electronic hold circuits for such telephone systems.

Key telephone systems are very well known, and they are widely used. Conventionally, they include a number of keys or pushbuttons (the terms "pushbuttons" and "keys" are used interchangeably) which may be used to selectively connect a particular telephone set to any one of many telephone lines which are shared by all users of the key system. Usually, the user who wishes to transfer a call from one key set to another must first push a hold key, than a line key. If he wishes to transfer the connection several times during the same call, he must always push the hold key each time, before he pushes a line key button. If he ever forgets to push the hold key before he pushes the line key, he releases the call.

The pushbutton assemblies generally include a mechanical arrangement for interlocking the keys. Thus, if a hold key is pushed while a line key is in an operated position, the line key is returned to normal. These key assemblies are mechanical devices which are highly developed and do not readily lend themselves to additional cost reductions which may further lower the cost of manufacture. For example, the interlocking arrangement for restoring the keys is a very old and highly developed device that is already made at about the lowest cost which can reasonably be expected from any suitable manufacturing technique. Any further cost reduction will almost certainly come about through a use of a new holding technique that does not require the mechanical interlock.

Accordingly, an object of this invention is to provide new and improved means for holding telephone calls during transfer under the control of pushbuttons at key stations. Here an object is to eliminate the necessity for operating the hold key each time that a call is transferred. A further object is to automatically operate an electronic switch that places a holding bridge across a line before the line opens during call transfer and removes the bridge when the subscriber returns to the line during the same call.

Another object is to reduce the cost of pushbutton assemblies commonly used in key telephones. Here, an object is to eliminate some of the interlocking mechanical parts which have been used heretofore. Yet another object is to use electronic means for providing hold functions, thus enabling a relatively high probability of great cost reduction when integrated circuits are used almost entirely to make a telephone set.

In keeping with an aspect of this invention, these and other objects are accomplished by means of an electronic switch placed across a telephone line. The switch is fired to complete a loop across the line when a holding bridge is desirable. If the calling subscriber thereafter returns to the line, the line is momentarily short circuited and the telephone is placed in parallel with the switch so that line current divides between the telephone and the switch which has previously fired and causing it to turn off.

The above mentioned and other features and objects of this invention and the manner of obtaining them will become more apparent, and the invention itself will be best understood by reference to the following description of an embodiment of the invention taken in conjunction with the accompanying drawing, in which a single sheet shows a schematic circuit diagram of a key system embodying the invention.

The inventive circuit includes a telephone set 20 selectively coupled to any one of a plurality of lines 21 via a number of individual line keys 22. As is conventional with most key telephones, ringing current is sent to a bell 23 via an entirely separate line 24. This way, the phone will ring regardless of whether any particular line key is or is not then operated. Also, conventional hookswitch contacts 26, are provided to trip ringing and to connect the telephone to the line. These contacts are shown at 26, as "any suitable" devices, and are not necessarily intended to be treated as part of any particular network configuration.

Each line terminates in an electronic switch, such as 30, connected across the ends of an individually associated telephone line. In this particular case, the switch is a four layer, four terminal device of a type generally sold under the names "Silicon Controlled Switch" (SCS) or "Transwitch." However, any other suitable switches may also be used.

The SCS electrodes include an anode 31, a cathode 32, a cathode gate 33, and an anode gate 34. If the SCS is initially turned off, it turns on when a positive voltage pulse is applied to the cathode gate 33. Thereafter, the diode 30 stays on as long as current flows through it; or, conversely stated, if current falls below a holding level, the diode turns off. If the anode gate 34 is pulsed by a negative voltage adequate to suck current out of the diode, it also starves and turns off. The resistor 35 connected between the cathode and cathode gate prevents any charges from building up on an associated capacitor or junction capacitance which charge might otherwise turn on the diode.

As those skilled in the art know, each line on a key telephone is connected to the contacts of an individually associated pushbutton. If the key associated with one line is operated, it automatically releases when the key associated with another line is pushed.

The key for line 1, for example, included (among others) break contacts 39 and make contacts 40, 41 for individually associating the telephone 20 with that particular line. The contacts 40, 41 close before contacts 39 open so that there is a dead short across the line for an instant during the hookswitch travel time. On release of the line key, the contacts, 40, 41 open before the contacts 39 close so that the shunt at 39 has no effect. The break contacts 42 open the anode circuit for switch 30 when the line 1 key is down. Thus, it is impossible for the diode 30 to be turned on if the line key is operated to open the contacts 42. The contacts 43 are a simple transfer arrangement. When the line key travels downwardly to connect the telephone set to the line, the break opens before the make closes, and there is no effect. When the line key travels upwardly to disconnect the telephone set from the line, the break closes before the make opens. Hence, there is no effect when the line key goes down, and a control pulse is generated when it goes up. The contact time relationships just described are drawn graphically by the curves near the bottom of the drawing.

The hookswitch contacts 45, 46 travel in the direction of the arrow 47 when the handset is removed from its support and in a reverse direction when it is returned. Thus, in the on-hook position contacts 45 are open and 46 are closed. In the off-hook position, the contacts 45 are closed and the contacts 46 are open.

Finally, the characteristics of the SCS diode 30 are such that is will not hold itself in an on condition when current divides across it and the closed contacts 39 while the key is traveling downwardly. It should be noted that this diode starvation is not too difficult to accomplish since lines 21 lead only to the well known wall box (not shown) of a key system. Therefore, all line impedances and the impedance between the wall box and the telephone sets are fairly uniform. Moreover, it is easy to provide any extra equipment in the wall box which may be required to insure a positive action diode starvation response to the short 39.

The circuit operates this way. First, assume that the telephone rings for line 1 while the line 1 key is down. The subscriber removes the hand set to close hookswitch contacts 26 in a normal manner. Since the line key is down contacts 40 41, are closed and contacts 39 are open. The key system and central office equipment operate in a well known manner, as they do responsive to any off-hook answering condition. When the call is completed and the subscriber station returns to an on-hook condition, the release is also effected in the well known manner.

Next, suppose that the subscriber wishes to leave the call while it is in progress and to transfer to another line. He pushes down on the line key associated with line 2, for example. As the key 50 goes down, the key of line 1 goes up owing to the internal mechanical interlock. The enabling contacts 42 close to prepare the SCS 30. The contacts 43 close and then open in order to transmit a positive voltage pulse from battery B1, through contacts 45, and capacitor 51 to the cathode gate on SCS 30. The SCS diode 30 turns on and current flows through the diode to bridge the line and hold central office equipment. The subscriber set 20 is now connected to line 2 and holding line 1.

Next, assume that another subscriber wishes to connect a different telephone set (similar to 20) to line 1. That subscriber goes off-hook and then pushes the line key associated with line 1. The contacts 40, 41 close to connect the line 21 to the telephone set (similar to 20) and thereby reestablish the loop for holding the central office equipment. The contacts 39 momentarily short circuit the line 21 to draw almost all of the current from the turned on SCS which is bridging the line, and it turns off.

If a second subscriber set is connected to line 1 while the first set is still connected thereto, there is no effect because the contacts 43 break before they make on the down stroke. There is a momentary short circuit on the line, but it is too brief for the subscriber to notice.

If two subscribers are talking on the same line and one wishes to disconnect, he should first hang up. The contacts 45 open and 46 close. A negative voltage pulse is sent from the battery B2 through the contacts 46, and capacitor 55 (and all similar contacts) to the anode gate of the SCS 30 to turn it (and all similar diodes) off. If the subscriber then pushes the key of line 2, for example, there is not effect when contacts 56 operate because contacts 45 are open. If the subscriber thereafter goes off-hook, he will be connected to line 2.

If it should be desirable to maintain current operating procedures to avoid confusing subscribers, it is possible to supply hold keys, and to arrange the circuit in a slightly different manner. For example, if the contacts 45 are put on a hold key, it is possible to simplify the contacts 43 and to maintain present day standard operating procedures. Or, under some circumstances, it may be desirable to supply a release key in lieu of the contacts 46. Another option is to provide contacts associated with capacitor 55 so that it would be possible to hang up and selectively close contacts similar to 46 without turning off all SCS's associated with that particular telephone. Those who are skilled in the art will think of still other modifications of contact arrangements which may be made in order to adapt the invention to fit the desired operating procedures.

While the principles of the invention have been described above in connection with specific apparatus and applications, it is to be understood that this description is made only by way of example and not as a limitation on the scope of the invention.

I claim:

1. A key telephone system comprising a telephone set connected to a plurality of telephone lines, a plurality of line keys at said telephone set, there being a line key individually associated with each of said lines for selectively connecting and disconnecting that telephone set to each line, and means responsive to the operation of any one of said line keys for releasing a previously operated one of said line keys and for placing an electronic holding bridge across the previously operated one of said lines.

2. The system of claim 1 wherein said electronic bridge comprises electronic switching means, and a second telephone set connected to said plurality of lines, and means responsive to an off-hook condition at said second telephone set for reducing the current to said bridge below its turnoff level.

3. The system of claim 1 and means whereby said electronic bridge is selectively controlled responsive to the sequence in which contacts of said line key operate when said line key is operated or restored.

4. The system of claim 3 and means responsive to operation of said key to a line connection position for placing a momentary short circuit across said line in order to reduce the current to said bridge below its turnoff level.

5. The system of claim 3 and means responsive to operation of said key to a line disconnect position for turning on said electronic holding bridge to maintain current flow over said line.

6. The system of claim 5 wherein said turning on means comprises contacts controlled by said key for controlling the transmission of a pulse during the mechanical movement of said key from said line connect to said line disconnect positions.

7. An electronic holding bridge for a key telephone system, comprising means for electronically completing a first holding circuit to a line to maintain a hold on said line, means for providing a second holding circuit in multiple with said first holding circuit responsive to the connection of a telephone to said line while said first holding circuit is on said line, and circuit means responsive to reduced current resulting from the connection of said telephone to said line releasing said first holding circuit.

8. The holding bridge of claim 7 wherein said electronic completing means comprises a silicon controlled device.